Figure 1:
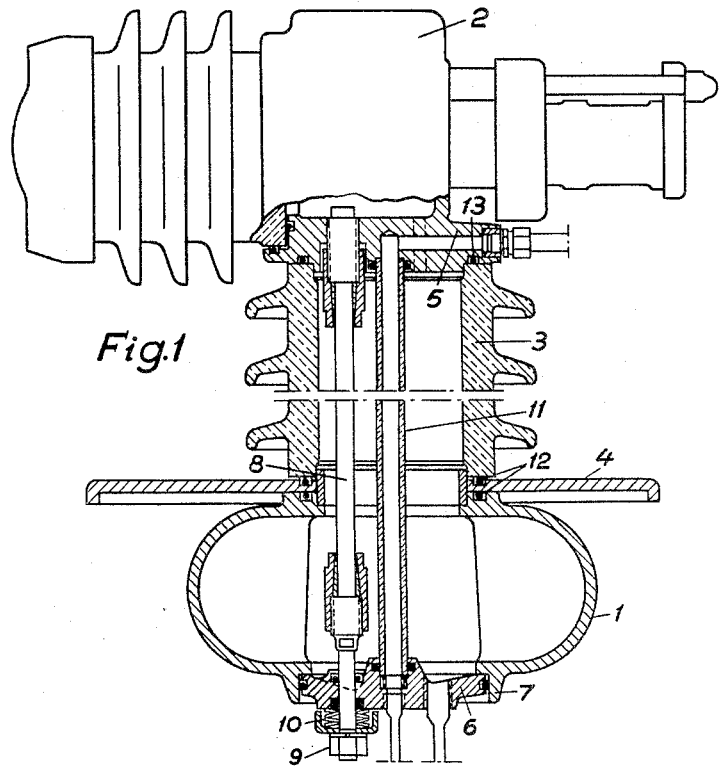

March 9, 1965

K. G. SINDAHL ETAL 3,172,943

LEADING-THROUGH BUSHING FILLED WITH GAS
OR LIQUID UNDER PRESSURE

Filed Oct. 3, 1962

INVENTORS
Karl Gustav Sindahl
Per Olov Grune
BY

Bailey, Stephens & Huettig

ATTORNEYS

United States Patent Office 3,172,943
Patented Mar. 9, 1965

3,172,943
LEADING-THROUGH BUSHING FILLED WITH
GAS OR LIQUID UNDER PRESSURE
Karl Gustav Sindahl and Per Olov Grune, Ludvika,
Sweden, assignors to Allmänna Svenska Elektriska
Aktiebolaget, Vasteras, Sweden, a Swedish corporation
Filed Oct. 3, 1962, Ser. No. 228,048
Claims priority, application Sweden, Oct. 7, 1961,
9,988/61
5 Claims. (Cl. 174—18)

Circuit breakers often comprise tube shaped insulators the object of which is to insulate voltage-carrying parts from each other or from earth and to conduct gas or liquid under pressure. The insulators are thus subjected to great mechanical strain and must be securely anchored to the support or to each other. Previously this has usually been done by casting the ends of the insulator in metal flanges which are then fixed by means of bolts to other corresponding flanges on, for example, a second insulator, support or compressed air container. The internal over-pressure to which the insulators are subjected thus causes great tensile stresses in the insulators. Great bending stresses caused, for example, by wind forces may also occur in the insulators, particularly at the flanges.

In order to a certain extent to decrease these stresses in the insulators it is known instead of flanges to use tension rods to hold the insulators together to each other or to the support. This means, however, that when the circuit breaker is mounted in a pressureless state the tension rods must be pre-stressed to such a degree that leaks do not occur between for example the insulators and the support after the breaker has been filled with compressed air.

The present invention relates to avoiding, inter alia, this disadvantage. The invention comprises an arrangement for keeping together means forming a hollow unit for gas or liquid under pressure. The means comprise a tubular part, at least partly formed of an insulating mantle, said tubular part being provided at one end with a holder. The invention is characterised in that the tubular part is closed at the other end by a member partly shaped as a cylinder containing a piston connected to the container.

By this arrangement all flanges are avoided and furthermore no tensile stresses whatsoever occur in the insulating mantle. A further great advantage is that the holder on the cylinder member only needs to be pressed against the hollow part with such force that mechanical stability is obtained when atmospheric pressure prevails in the unit. This is because the sealing pressure between the different parts increasing pressure in the hollow unit since the piston is subjected to this inner pressure.

According to a particular embodiment of the invention the surface of the piston is made at least as large as the surface which is enclosed by a sealing ring between the members being held together, for example the hollow part and the holder. In this way the sealing influence along the contact surface at the relevant sealing ring may be made independent of the pressure prevailing in the hollow unit or may increase in direct proportion to this pressure. In the latter case of course, the surface enclosed by the sealing ring is less than the surface of the piston.

In order to obtain an equally distributed sealing pressure along all the sealing surfaces it is suitable that the holder is connected to the piston by means of a central rod or, for example, three peripherally placed rods. These are suitably given a certain pre-tension by means of springs adjusted so that good sealing is obtained along the different sealing surfaces even when the hollow unit contains air under atmospheric pressure. Because of the piston arrangement the springs may be made relatively weak without the sealing pressure when high pressure exists in the hollow unit becoming insufficient.

The tubular part may of course be composed of two or more insulating mantles. Similarly it is possible to attach the tubular part to a supporting plate by clamping this plate between a pair of the members which are held together, for example, the tubular part and the member containing the piston. The plate is then provided with an opening within the tubular part.

According to a particular embodiment of the invention the means form a leading-through bushing for an electric conductor through an opening in a wall. The tubular part comprises a first and a second insulating mantle pressed against the wall on both sides of this and held together by the conductor serving as leading-through bushing and joining the piston in the piston member pressed against the outer end surface of the first mantle to the holder pressed against the second mantle. According to this embodiment of the invention a leading-through bushing is obtained filled with gas or liquid under pressure, which leading-through bushing is held together by substantially only the leading-through bolt without the sealing between the different parts of the leading-through bushing varying dependent upon the temperature, despite the fact that the leading-through bolt does not have the same thermal expansion coefficient as the insulating parts of the leading-through bushing it holds together.

When the leading-through bushing is arranged in the wall of a container containin gas or liquid under pressure, a channel is suitably arranged between the container and the hollow of the leading-through bushing so that the same pressure is obtained in this as in the container.

Figure 2:
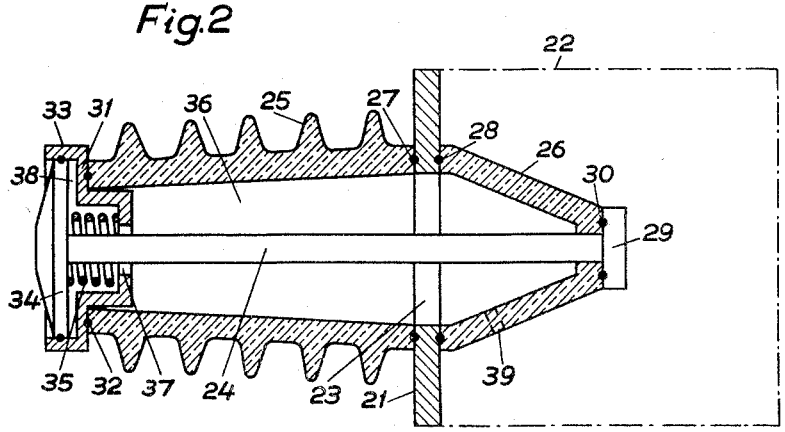

The invention will be best understood with reference to the accompanying FIGURES 1 and 2 which show different embodiments of the invention.

In FIGURE 1, 1 designates an air blast container at ground potential and 2 a second air blast container at a high voltage potential containing the breaking gap, not shown. The container 2 is supported by the pillar insulator 3. 4 is a part of the support and both the insulator 3 and the container 1 are sealed to this support. Of course the insulator 3 could alternatively be directly sealed to the container 1. At its other end the insulator 3 is closed by a sealing part or the holder 5. This holder 5 is connected to a piston 6 arranged in a cylinder in the wall of the container 1.

Only one of the connection rods 8 is shown in the figure. The piston 6 is slidably arranged on the rod 8 which is of insulating material. The piston 6 is kept in place by a nut 9. A spring 10 is arranged between the piston and the nut to press together the different parts 1, 3, 4 and 5 with the right pressure when the container 1 and the pillar insulator 3 do not contain a medium having higher pressure than the surrounding pressure. The rod 8 is further rigidly connected to the holder 5. 11 is a blast air conduit for operating air and is slidably arranged in the piston 6. The container 1 and the insulator 3 are sealed directly against the support plate 4 by means of sealing rings 12 and the holder 5 is sealed against the insulator by means of a sealing ring 13. If, for example, the piston 6 is made with the same diameter as the sealing rings it will immediately be seen from the figure that the sealing pressure on the sealing rings will be independent of the pressure prevailing in the hollow of the unit. If, on the other hand, the piston 6 is made with a larger diameter than the sealing rings the sealing pressure on the sealing rings will increase in direct proportion to the pressure in the hollow of the unit.

FIGURE 2 shows one embodiment of a leading-through bushing according to the invention. In FIGURE 2, 21 designates one wall in a schematically shown container 22.

There is an opening 23 in the wall through which the electric conductor acting as leading-through bolt 24 passes. On each side of the wall around the opening mantles 25 and 26 of insulating material are arranged. The mantles are held together by the leading-through bolt 24 and sealed against the wall by the sealing rings 27 and 28. In the container the leading-through bolt 24 is provided with a head 29 which if necessary may be sealed against the outer end surface of the mantle 26 by means of a sealing ring 30. The insulating mantle 25 is provided at its outer end surface with a washer 31 which is sealed against the outer end surface of the mantle 25 by means of a sealing ring 32. The washer is partly shaped as a cylinder 33 in which a piston 34 joined to the leading-through bolt 24 sealingly slides. Between the washer 31 and the piston 34 is a spring 35 to effect pre-tension in the leading-through bolt and thus good sealing both between the mantles of the leading-through bushing and the wall and between the mantles and the leading-through bolt. The mantles 25 and 26 form a hollow 36 which through the opening 37 permanently communicates with the space 38 limited by the cylinder 33 and piston 34.

If, for example, the piston 34 has the same diameter as the sealing ring 27, that is, if the piston has the same surface as the surface enclosed by the sealing ring 27, it will be immediately seen from the figure that the sealing pressure between the wall 21 and the mantle 25 will be independent of the pressure prevailing in the hollow of the leading-through bushing. If, on the other hand, the piston 34 has a larger diameter than the sealing ring 27, the sealing pressure of the mantle 25 against the wall 21 will increase in direct proportion to the pressure in the hollow 36 of the leading-through bushing.

If the container 22 is filled with a medium under pressure, for example gas, it may be suitable to arrange a channel 39 through the mantle 26. The hollow 36 will thus always contain a medium having the same pressure as the container 22. Thus the sealing rings 28 and 30, for example, will be unnecessary and further, as shown in the figure, the mantle 26 with respect to the increased insulation strength in the container 22 may be made considerably shorter than the mantle 25 which is assumed to be arranged in air having atmospheric pressure.

We claim:
1. In a circuit breaker, a wall having an opening therein, means on opposite sides of the wall forming a chamber on both sides of the opening for holding gas under pressure, the means on one side of the wall comprising a holder member and the means on the other side of the wall comprising a closure member having a portion of cylindrical shape remote from the wall, a piston slidable in said portion having one surface exposed to the interior of the chamber, and a connecting element extending through the opening in the wall and having its ends operatively connected to the holder member and piston respectively, said chamber being filled with gas at a pressure substantially greater than the pressure on the outside of the chamber.

2. In a device as claimed in claim 1, annular sealing means between at least one of said members and said wall, the surface area of the piston being at least as great as the area enclosed by said annular sealing means.

3. A device as claimed in claim 2, in which said members are insulators.

4. In a device as claimed in claim 1, said closure member and said holder member being insulators and said connecting element being a conductor.

5. In a device as claimed in claim 4, annular sealing means between at least one of said members and said wall, the surface area of the piston being at least as great as the area enclosed by said annular sealing means.

References Cited by the Examiner
UNITED STATES PATENTS 2,292,031   8/42   Arnold _____ 174—12 X

FOREIGN PATENTS 231,908   5/59   Australia.
886,327   8/53   Germany.
559,846   3/44   Great Britain.

DARRELL L. CLAY, *Primary Examiner.*
JOHN P. WILDMAN, LARAMIE E. ASKIN,
                              *Examiners.*